Patented Dec. 28, 1926.

1,612,744

UNITED STATES PATENT OFFICE.

KARL RAST, OF LEVERKUSEN, NEAR COLOGNE-ON-THE-RHINE, GERMANY, ASSIGNOR TO I. G. FARBENINDUSTRIE AKTIENGESELLSCHAFT, OF FRANKFORT-ON-THE-MAIN, GERMANY.

PROCESS FOR OBTAINING LIQUIDS IN A SOLID STATE.

No Drawing. Application filed January 15, 1926, Serial No. 81,573, and in Germany December 11, 1924.

The present invention concerns the conversion of organic liquids in a simple manner into a more or less solid form, which process takes place when such liquids are mixed with magnesium alcoholates in the presence of small quantities of water.

The following examples will serve to illustrate my invention:

*Example 1.*—120 parts of methyl alcohol containing about 0.5 to 1% of water are mixed with a solution of 1 part of magnesium in 30 parts of methyl alcohol. The mixture sets in a short time to a solid jelly.

Ethyl alcohol and other alcohols may be obtained in a solid state, containing only 1% residue, such products possessing the great advantage that they do not melt on heating.

*Example 2.*—To 10 parts of castor oil 1 to 2 parts of magnesium alcoholate solution are added and then 0.1 part of water dissolved in a little alcohol is introduced into the mixture. The formation of a jelly takes place in a very short time. Likewise the consistency of other oils, as for example engine oil, may be increased in this manner.

*Example 3.*—Liquid hydrocyanic acid having a small content of water, on the addition of magnesium alcoholate solution, can be converted after standing for some time into a solid jelly, the use of which offers advantages in many cases over the liquid form.

As further examples of liquids which are easily amenable to such a solidifying treatment the following may be mentioned; epichlorhydrin, chloroform, benzene, xylene. Besides homogeneous liquids, mixtures of liquids with one another or with solid or gaseous substances, such, for example, as alcoholic ammonia, may be obtained in a solid state in accordance with the process, the subject of my invention.

The process may also be carried out in combination with other processes serving the same purpose.

I claim:

1. Process of obtaining liquids in a solid or semi-solid state which comprises mixing an organic liquid with a magnesium alcoholate in the presence of a limited quantity of water.

2. Process of obtaining liquids in a solid or semi-solid state as defined in claim 1 in which the organic liquid comprises a plurality of constituents.

3. As a new product a solid or semi-solid material comprising a normally liquid organic component and the products of hydrolysis of a magnesium alcoholate.

In testimony whereof I have hereunto set my hand.

KARL RAST.